(12) United States Patent
Saje et al.

(10) Patent No.: US 10,661,840 B1
(45) Date of Patent: May 26, 2020

(54) INTERLOCKING BODY AND FLOOR PAN ASSEMBLY FOR BELOW FLOOR ENERGY STORED VEHICLES

(71) Applicant: GM Global Technology Operations LLC, Detroit, MI (US)

(72) Inventors: Robert N. Saje, Shelby Township, MI (US); Peter M. Parlow, Columbus, MI (US); Keith J. Saari, Macomb Township, MI (US); John R. Sulik, II, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/202,951

(22) Filed: Nov. 28, 2018

(51) Int. Cl.
*B62D 25/02* (2006.01)
*B62D 25/20* (2006.01)
*B62D 27/02* (2006.01)
*B60K 1/04* (2019.01)

(52) U.S. Cl.
CPC .......... *B62D 25/2018* (2013.01); *B60K 1/04* (2013.01); *B62D 25/2027* (2013.01); *B62D 27/026* (2013.01); *B60K 2001/0438* (2013.01)

(58) Field of Classification Search
CPC .......... B62D 25/2018; B62D 25/2027; B62D 27/026; B60K 1/04

USPC .............. 296/204, 193.07, 187.08
See application file for complete search history.

(56) References Cited

U.S. PATENT DOCUMENTS

2014/0319874 A1* 10/2014 Matsuda ............ B62D 25/2036
296/187.12
2015/0048652 A1* 2/2015 Maeda ................ B62D 21/15
296/187.08

* cited by examiner

*Primary Examiner* — Joseph D. Pape

(57) ABSTRACT

An interlocking body and floor pan assembly for a below-floor energy stored vehicle includes a vehicle structural assembly having a front compartment section connected to a rear compartment section using first and second rocker members. The front compartment section includes a compartment front cross-beam and the rear compartment section includes a compartment rear cross-beam oriented parallel to the compartment front cross-beam. The vehicle structural assembly defines a bucket configuration having faces of the compartment front cross-beam and the compartment rear cross-beam angularly oriented from an upper outboard edge downwardly pitching to a lower inboard edge. A prefabricated sub-floor assembly seats on flange structure and is positioned with a clearance to the bucket configuration of the vehicle structural assembly. An outer perimeter of the sub-floor assembly is larger than an inner perimeter of the vehicle structural assembly where the sub-floor assembly contacts the vehicle structural assembly.

19 Claims, 6 Drawing Sheets

INTERLOCKING BODY AND FLOOR PAN ASSEMBLY FOR BELOW FLOOR ENERGY STORED VEHICLES

INTRODUCTION

The present disclosure relates to body and floor pan structures for automobile vehicles including below-floor energy stored vehicles.

Automobile vehicles including below-floor energy stored vehicles such as electric and hybrid vehicles having multiple battery cells for power generation commonly require mounting the battery cells low in the vehicle cross section to place the battery mass below vehicle passenger compartments. Battery cells are therefore commonly positioned on a battery pan structure which is hung from below the floor structure. These locations commonly place structural joining items such as fasteners used to join vehicle frame members and floor pans in tension. Assembly sequencing of the vehicle structure must also accommodate multiple fastener installations, which themselves individually introduce dimensional stack-up issues and create non-reducible assembly time intervals as each fastener is placed.

Thus, while current battery pan support structures for below-floor energy stored vehicles such as electric and hybrid vehicles achieve their intended purpose, there is a need for a new and improved assembly for vehicle structure mounting.

SUMMARY

According to several aspects, an interlocking body and floor pan assembly for a below-floor energy stored vehicle includes a vehicle structural assembly including a front compartment section connected to a rear compartment section using a first rocker member and an opposed second rocker member oriented parallel to the first rocker member. The vehicle structural assembly is configured to define a bucket configuration having faces of each of the front compartment section and the rear compartment having oppositely facing structural faces with the front compartment section angularly oriented forward at a top and rearward at a bottom, and the rear compartment section angularly oriented rearward at a top and forward at a bottom. A prefabricated sub-floor assembly is angularly configured such that the sub-floor assembly seats on a flange structure and is positioned with a clearance to the bucket configuration of the vehicle structural assembly.

In another aspect of the present disclosure, the front compartment section includes a compartment front cross-beam and the rear compartment section includes a compartment rear cross-beam which is oriented substantially parallel to the compartment front cross-beam.

In another aspect of the present disclosure, the compartment front cross-beam includes an upper forward-facing angular surface and a lower rear-facing angular surface which supports a sub-floor front cross-beam of the sub-floor assembly; and the compartment rear cross-beam includes an upper rearward facing angular surface and a lower forward-facing angular surface which supports a sub-floor rear cross-beam of the sub-floor assembly.

In another aspect of the present disclosure, a gap is provided between the rear-facing angular surface of a rear-facing beam wall of the compartment front cross-beam and a front-facing angular surface of an outer wall of the sub-floor front cross-beam of the sub-floor assembly, the gap maintained by orienting the rear-facing angular surface substantially parallel with the front-facing angular surface.

In another aspect of the present disclosure, the first rocker member and the second rocker member are angularly oriented from an upper outboard edge downwardly pitching to a lower inboard edge of each of the first rocker member and the second rocker member providing the bucket configuration for the first rocker member and the second rocker.

In another aspect of the present disclosure, the first rocker member includes a right-facing angular surface facing from a driver side toward a passenger side of the vehicle, which supports a left support-beam of the sub-floor assembly; and the second rocker member includes a left-facing angular surface facing from a passenger side toward a driver side of the vehicle, which supports a right support-beam of the sub-floor assembly.

In another aspect of the present disclosure, an outer perimeter of the sub-floor assembly is larger than an inner perimeter of the vehicle structural assembly where the sub-floor assembly contacts the vehicle structural assembly.

In another aspect of the present disclosure, a design clearance provided between the outer perimeter of the sub-floor assembly and the inner perimeter of the vehicle structural assembly, wherein the design clearance is approximately 10 mm.

In another aspect of the present disclosure, a front torque box member is provided at each of opposed ends of the compartment front cross-beam creating a connection of the compartment front cross-beam with each of the first rocker member and the second rocker member. A rear torque box member is provided at opposed ends of the compartment rear cross-beam creating a connection of the compartment rear cross-beam with each of the first rocker member and the second rocker member.

In another aspect of the present disclosure, first and second floor-caps are located at front corners of the sub-floor assembly and positioned on top of the compartment front cross-beam and covering the front torque box members.

In another aspect of the present disclosure, a first B-pillar cap is fixed to the first floor-cap and a right side "B" pillar structure. A second B-pillar cap is fixed to the second floor-cap and a left side "B" pillar structure.

According to several aspects, an interlocking body and floor pan assembly for a below-floor energy stored vehicle includes a vehicle structural assembly including a front compartment section connected to a rear compartment section using a first rocker member and an opposed, parallel oriented second rocker member. The front compartment section includes a compartment front cross-beam and the rear compartment section includes a compartment rear cross-beam oriented substantially parallel to the compartment front cross-beam. The vehicle structural assembly defines a bucket configuration having faces of each of the compartment front cross-beam and the compartment rear cross-beam angularly oriented from an upper outboard edge downwardly pitching to a lower inboard edge. A prefabricated sub-floor assembly seats on flange structure and is positioned with a clearance to the bucket configuration of the vehicle structural assembly. An outer perimeter of the sub-floor assembly is larger than an inner perimeter of the vehicle structural assembly where the sub-floor assembly contacts the vehicle structural assembly.

In another aspect of the present disclosure, first and second torque box members are individually provided at each of opposed ends of the compartment front cross-beam creating a connection of the compartment front cross-beam with each of the first rocker member and the second rocker member, each of the first and second torque box members having a flange supporting a sub-floor front cross-beam of the sub-floor assembly.

In another aspect of the present disclosure, third and fourth torque box members individually provided at each of opposed ends of the compartment rear cross-beam creating a connection of the compartment rear cross-beam with each of the first rocker member and the second rocker member, each of the third and fourth torque box members having a flange supporting a sub-floor rear cross-beam of the sub-floor assembly.

In another aspect of the present disclosure, first and second floor-caps are located at front corners of the sub-floor assembly and positioned on top of the compartment front cross-beam and covering the first and second torque box members.

In another aspect of the present disclosure, third and fourth floor-caps are located at rear corners of the sub-floor assembly and positioned on top of the compartment rear cross-beam and covering the third and fourth torque box members.

In another aspect of the present disclosure, a rear-facing angular surface of the compartment front cross-beam supports a sub-floor front cross-beam of the sub-floor assembly; and a shear plate connected to each of the compartment front cross-beam and the sub-floor front cross-beam of the sub-floor assembly.

According to several aspects, an interlocking body and floor pan assembly for a below-floor energy stored vehicle includes a vehicle structural assembly including a front compartment section connected to a rear compartment section using a first rocker member and an opposed, parallel oriented second rocker member. The front compartment section includes a compartment front cross-beam and the rear compartment section including a compartment rear cross-beam oriented substantially parallel to the compartment front cross-beam. A prefabricated sub-floor assembly seats on flange structure and is positioned with a clearance to the bucket configuration of the vehicle structural assembly, the sub-floor assembly having a sub-floor front cross-beam. A rear-facing angular surface of the compartment front cross-beam supports the sub-floor front cross-beam of the sub-floor assembly. A shear plate is connected to each of the compartment front cross-beam and the sub-floor front cross-beam of the sub-floor assembly.

In another aspect of the present disclosure, the vehicle structural assembly defines a bucket configuration having faces of each of the compartment front cross-beam and the compartment rear cross-beam having oppositely facing structural faces with the front cross beam angularly oriented forward at a top and rearward at a bottom, and the rear cross beam angularly oriented rearward at a top and forward at a bottom.

In another aspect of the present disclosure, an outer perimeter of the sub-floor assembly is larger than an inner perimeter of the vehicle structural assembly where the sub-floor assembly contacts the vehicle structural assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
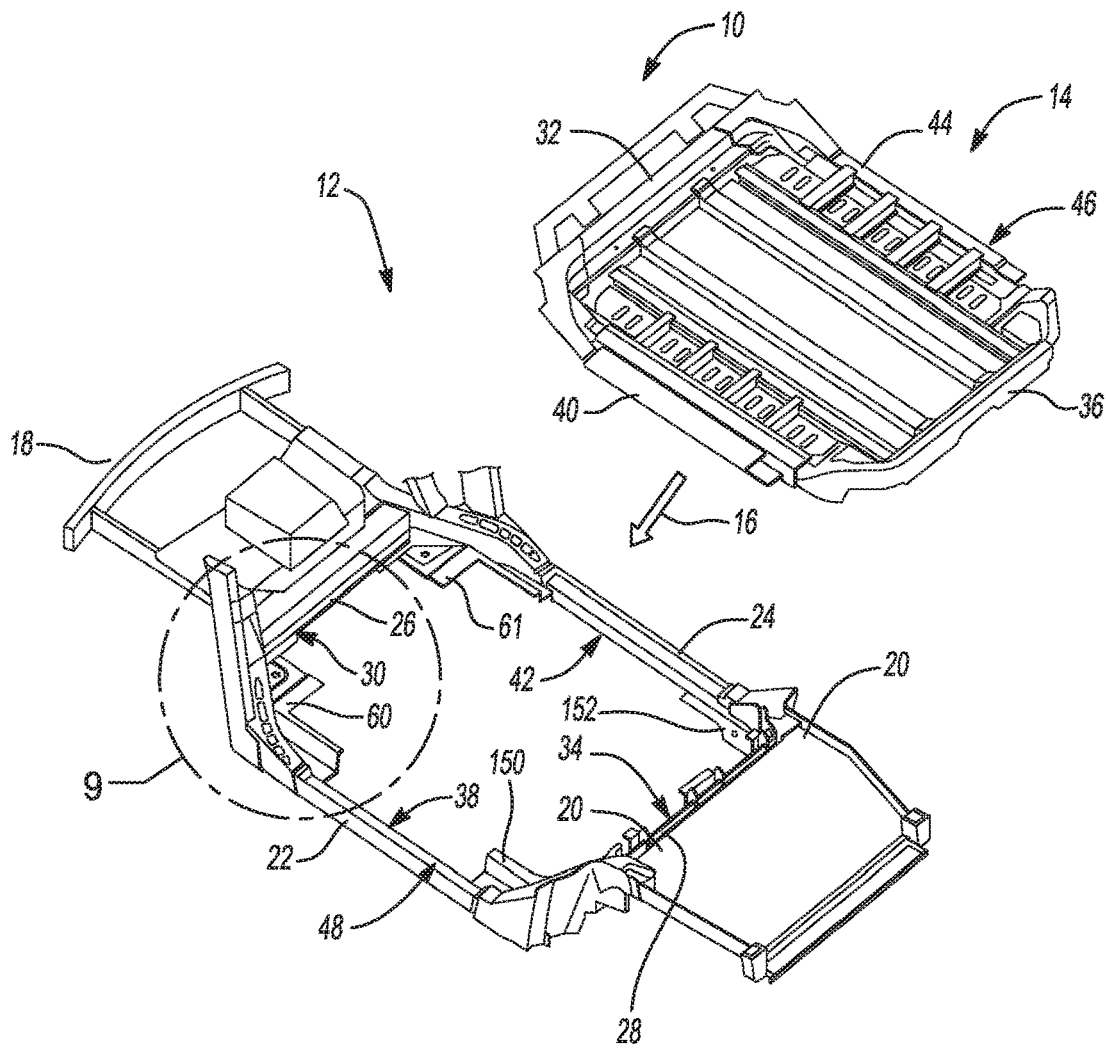
FIG. 1 is a left rear exploded perspective view of an interlocking body and floor pan assembly according to an exemplary embodiment.

Referring to FIG. 1, an interlocking body and floor pan assembly 10 for a below-floor energy stored vehicle includes a vehicle structural assembly 12 onto which is landed a prefabricated sub-floor assembly 14 in a downward loading path 16. The vehicle structural assembly 12 includes a front compartment section 18 connected to a rear compartment section 20 using a first rocker member 22 and an opposed, parallel running second rocker member 24. The vehicle structural assembly 12 is configured to provide a "bucket" configuration having oppositely facing structural faces of each of the front compartment section 18 angularly oriented forward at a top and rearward at a bottom, and the rear compartment section 20 that is angularly oriented rearward at a top and forward at a bottom. According to further aspects, the "bucket" configuration further provides structural faces of each of the first rocker member 22 and the second rocker member 24 that are oppositely facing and each angularly oriented from an upper outboard edge downwardly pitching to a lower inboard edge of each of the first rocker member 22 and the second rocker member 24. The sub-floor assembly 14 is similarly angularly configured such that the sub-floor assembly 14 contacts and seats on flange structure and is positioned with a clearance to the bucket configuration of the vehicle structural assembly 12, improving accurate fixture positioning when installing the sub-floor assembly 14 on the vehicle structural assembly 12.

According the several aspects, the front compartment section 18 includes a compartment front cross-beam 26 and the rear compartment section 20 includes a compartment rear cross-beam 28 which is oriented substantially parallel to the compartment front cross-beam 26. The compartment front cross-beam 26 includes a rear-facing angular surface 30, which supports a sub-floor front cross-beam 32 of the sub-floor assembly 14. The compartment rear cross-beam 28 includes a front-facing angular surface 34, which supports a sub-floor rear cross-beam 36 of the sub-floor assembly 14. The first rocker member 22 includes a right-facing angular surface 38, facing from a driver side toward a passenger side of the vehicle (defined from lower left to upper right as viewed in FIG. 1), which supports a left support-beam 40 of the sub-floor assembly 14. The second rocker member 24 includes a left-facing angular surface 42, facing from a passenger side toward a driver side of the vehicle (defined from upper right to lower left as viewed in FIG. 1), which supports a right support-beam 44 of the sub-floor assembly 14. An outer perimeter 46 of the sub-floor assembly 14 is larger than an inner perimeter 48 of the vehicle structural assembly 12 where the sub-floor assembly 14 contacts the vehicle structural assembly 12, with complementary angled or pitched surfaces creating the bucket configuration of the sub-floor assembly 14 on the vehicle structural assembly 12.

Referring to FIG. 2 and again to FIG. 1, the sub-floor assembly 14 is depicted after seating contact creating the bucket configuration is made with the vehicle structural assembly 12. The sub-floor assembly 14 can be fixed to the vehicle structural assembly 12 using fasteners such as spin fasteners and using an adhesive such as an epoxy.

Figure 2:
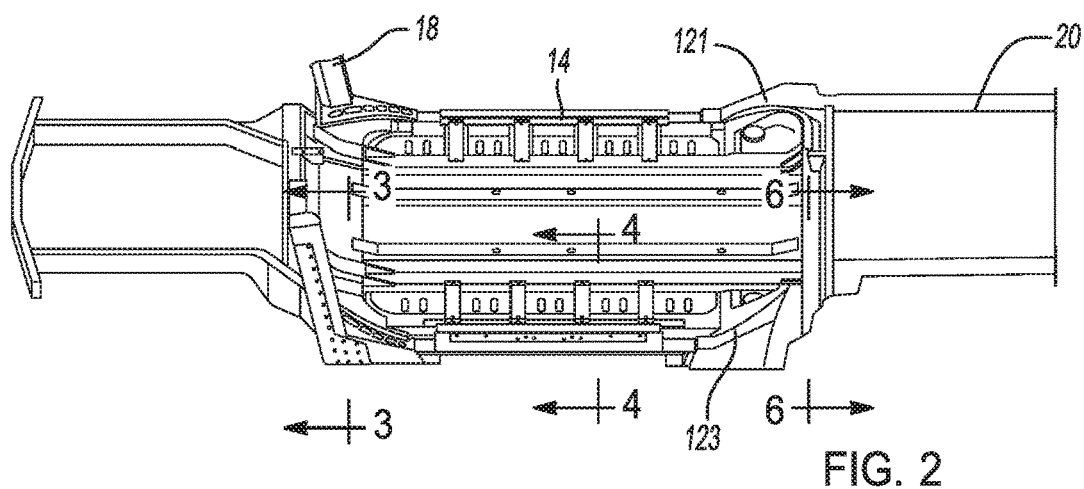
FIG. 2 is a left elevational perspective view of the interlocking body and floor pan assembly of FIG. 1 after assembly.

Referring to FIG. 3 and again to FIGS. 1 and 2, to allow for robotic installation and construction tolerances, a design clearance is provided between the outer perimeter 46 of the sub-floor assembly 14 and the inner perimeter 48 of the vehicle structural assembly 12. According to several aspects, the design clearance is approximately 10 mm. The design clearance allows the sub-floor assembly 14 to be constrained during reaction events by front and rear structural features of the vehicle structural assembly 12 and therefore to reach against either the front or rear structural features. A gap 50 is therefore nominally provided between the rear-facing angular surface 30 of a rear-facing beam wall 31 of the compartment front cross-beam 26 and a front-facing angular surface 52 of an outer wall 54 of the sub-floor front cross-beam 32 of the sub-floor assembly 14. The gap 50 has a nominal clearance dimension 56 of approximately 10 mm which is maintained by orienting the rear-facing angular surface 30 substantially parallel with the front-facing angular surface 52. To create the bucket configuration each of the rear-facing angular surface 30 and the front-facing angular surface 52 are oriented at an angle alpha ($\alpha$) with respect to a vertical plane 58. According to several aspects angle $\alpha$ can range from approximately 2 degrees up to approximately 80 degrees.

Opposite left-handed and right-handed torque box members 60, 61 (only the left-handed torque box member 60 is shown in this view) are provided at each of the opposed ends of the compartment front cross-beam 26 at the connection of the compartment front cross-beam 26 with each of the first rocker member 22 and the second rocker member 24. Each torque box member 60, 61 provides the primary structural connection between these items. A secondary connection is provided to fix the compartment front cross-beam 26 to the sub-floor front cross-beam 32 using a shear plate 62 which may be welded, fastened and/or adhesively bonded to each of the compartment front cross-beam 26 to the sub-floor front cross-beam 32. The shear plate 62 is directly fixed to an upper surface 64 of a beam wall 66 of the compartment front cross-beam 26 and to an upper surface 68 of a beam wall 70 of the sub-floor front cross-beam 32 and is angled to be rear-facing.

Figure 3:
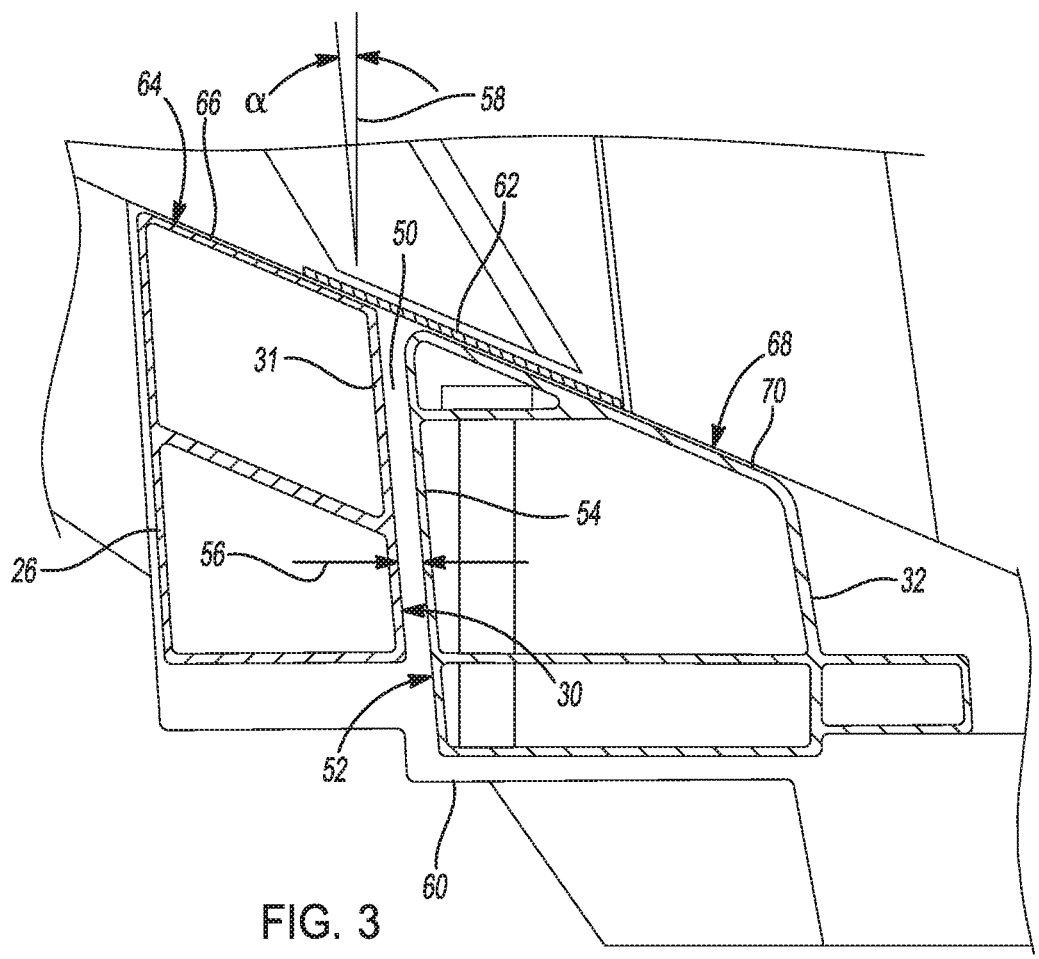
FIG. 3 is a cross sectional side elevational view taken at section 3 of FIG. 2.
Figure 4:
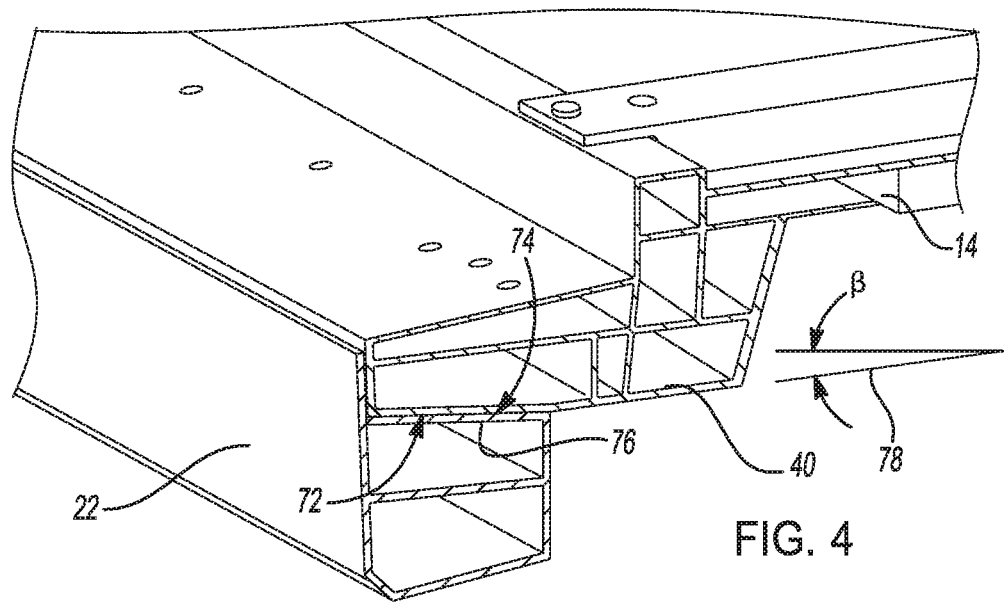
FIG. 4 is a cross sectional left perspective view taken at section 4 of FIG. 2.

Referring to FIG. 4 and again to FIGS. 1 through 3, the following discussion of the left support-beam 40 also applies equally to the right support-beam 44 of the sub-floor assembly 14, therefore only the left support-beam 40 is further described herein. The left support-beam 40 includes a side-facing angular surface 72 which is positioned proximate to an upwardly-directed angular surface 74 of a beam wall 76 of the first rocker member 22. According to several aspects, to create the bucket configuration for mounting the sub-floor assembly 14 to the rocker members, the upwardly-directed angular surface 74 of the beam wall 76 is oriented at an angle beta ($\beta$) with respect to a horizontal plane 78. According to several aspects the angular range of angle $\beta$ is similar to angle $\alpha$ and can therefore range from approximately 2 degrees up to approximately 80 degrees.

Figure 5:
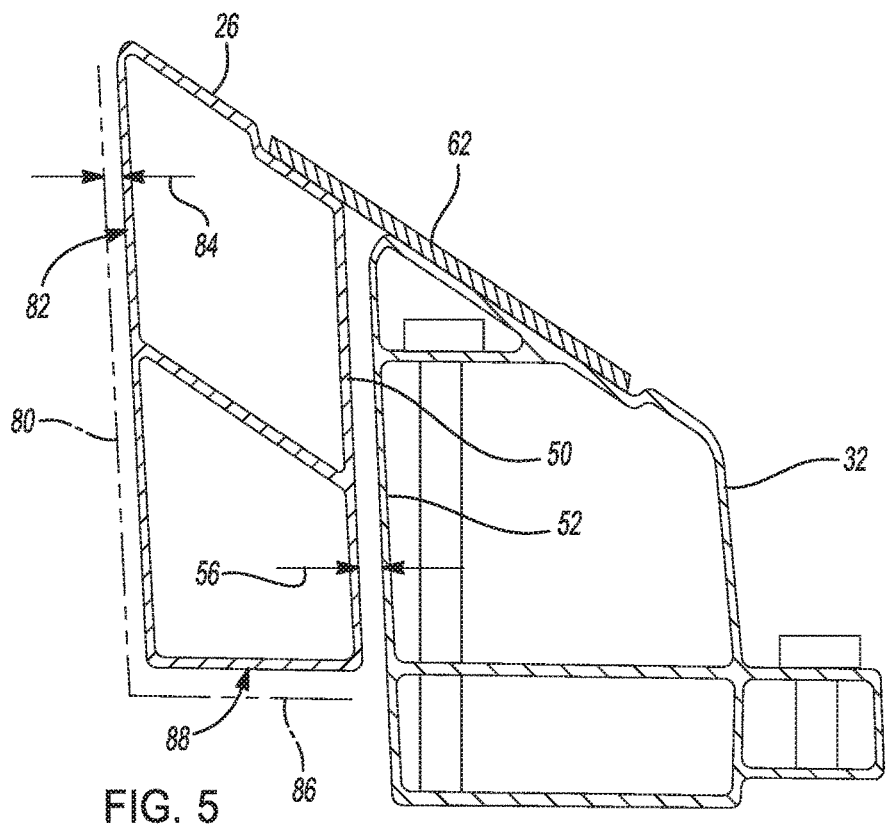
FIG. 5 is a cross sectional side elevational view similar to FIG. 3 of another aspect.

Referring to FIG. 5 and again to FIG. 3, according to several aspects the design clearance of approximately 10 mm between the vehicle structural assembly 12 and the sub-floor assembly 14 can be accommodated in different locations. For example, in lieu of providing the design clearance at the gap 50, a design clearance 80 of approximately 10 mm is provided forward of a forward-facing angular surface 82 of the compartment front cross-beam 26. A similar design clearance 86 can also be provided below a lower surface 88 of the compartment front cross-beam 26.

Figure 6:
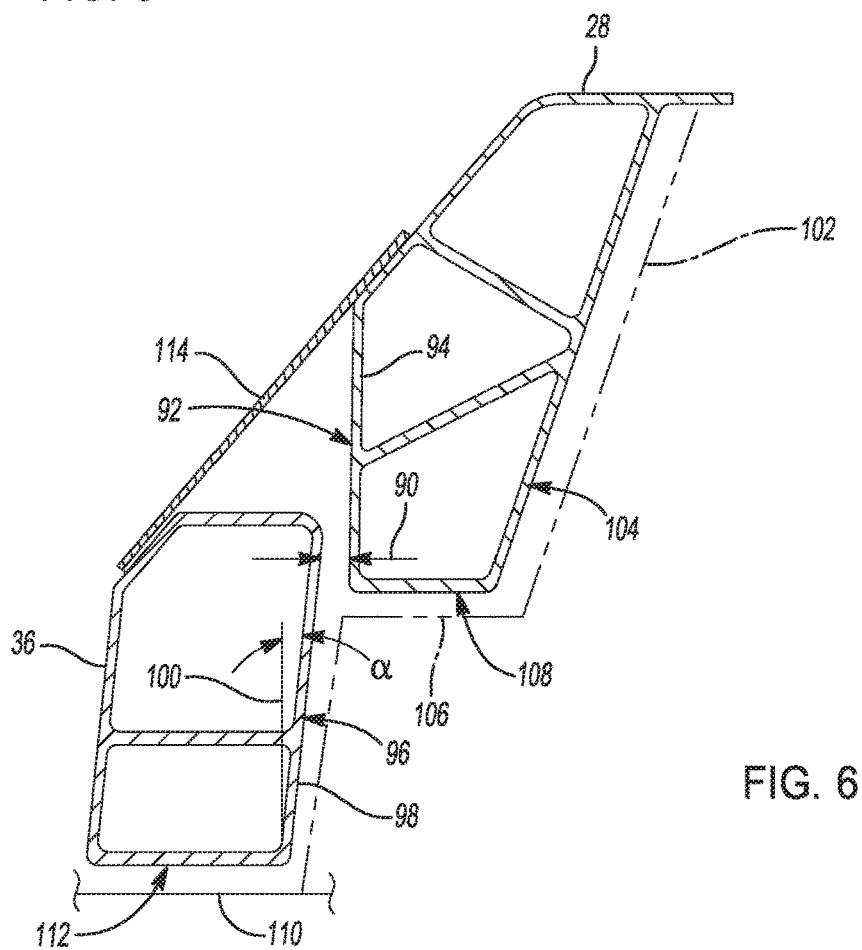
FIG. 6 is a cross sectional side elevational view taken at section 6 of FIG. 2.

Referring to FIG. 6, the connections and configurations of the sub-floor rear cross-beam 36 and the compartment rear cross-beam 28 are similar but oppositely directed with respect to the configurations of the sub-floor front cross-beam 32 and the compartment front cross-beam 26. To allow for robotic installation and construction tolerances, the design clearance of approximately 10 mm is provided by a nominal clearance dimension 90 nominally provided between a forward-facing angular surface 92 of a forward-facing beam wall 94 of the compartment rear cross-beam 28 and a rearward-facing angular surface 96 of an outer wall 98 of the sub-floor rear cross-beam 36 of the sub-floor assembly 14. The nominal clearance dimension 90 of approximately 10 mm is maintained by orienting the forward-facing angular surface 92 substantially parallel with the rearward-facing angular surface 96. To create the bucket configuration each of the forward-facing angular surface 92 and the rearward-facing angular surface 96 are oriented at the angle alpha ($\alpha$) with respect to a vertical plane 100. According to several aspects angle $\alpha$ can range from approximately 2 degrees up to approximately 80 degrees.

According to several aspects the design clearance of approximately 10 mm between the vehicle structural assembly 12 and the sub-floor assembly 14 can be accommodated in different locations at the rear structural members. For example, in lieu of providing the design clearance using the nominal clearance dimension 90, a design clearance 102 of approximately 10 mm is provided rearward of a rearward-facing angular surface 104 of the compartment rear cross-beam 28. A similar design clearance 106 can also be provided below a lower surface 108 of the compartment rear cross-beam 28.

A torque box member 110 is provided at each of the opposed ends of the compartment rear cross-beam 28 at the connection of the compartment rear cross-beam 28 with each of the first rocker member 22 and the second rocker member 24. The torque box member 110 provides the primary structural connection between these items. A secondary connection is provided to fix the compartment rear cross-beam 28 to the sub-floor rear cross-beam 36 using a shear plate 114 which may be welded, fastened and/or adhesively bonded to each of the compartment rear cross-beam 28 to the sub-floor rear cross-beam 36. Similar to the shear plate 62, the shear plate 114 is directly fixed to an upper surface of a beam wall of the compartment rear cross-beam 28 and to an upper surface of a beam wall of the sub-floor rear cross-beam 36 and is front-facing and therefore oppositely facing with respect to the rear-facing shear plate 62.

Figure 7:
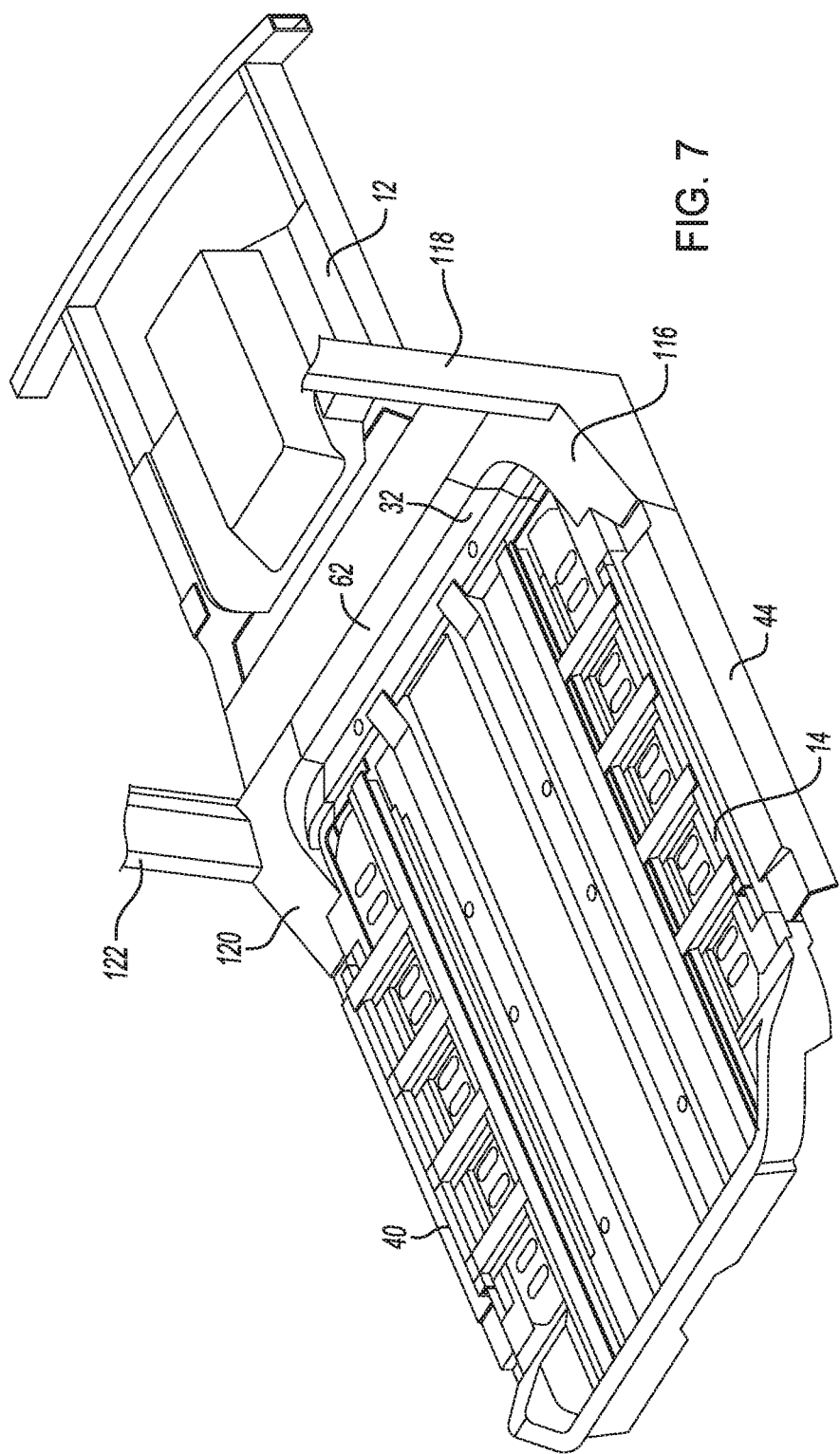
FIG. 7 is a top right perspective view of a front portion the interlocking body and floor pan assembly of FIG. 1 after assembly.

Referring to FIG. 7, floor-caps are provided at front corners of the sub-floor assembly 14 on top of the compartment front cross-beam 26 and covering the torque box members which resist shear moments. These include a first floor-cap 116 which is fixed to each of the sub-floor front cross-beam 32, the shear plate 62, the right support-beam 44 and to a right side "B" pillar structure 118. A second floor-cap 120 is similarly fixed to each of the sub-floor front cross-beam 32, the shear plate 62, the left support-beam 40 of the sub-floor assembly 14 and to a left side "B" pillar structure 122. With continuing reference to FIG. 2 similar third and fourth floor-caps 121, 123 are provided at opposing rear corners of the sub-floor assembly 14.

Figure 8:
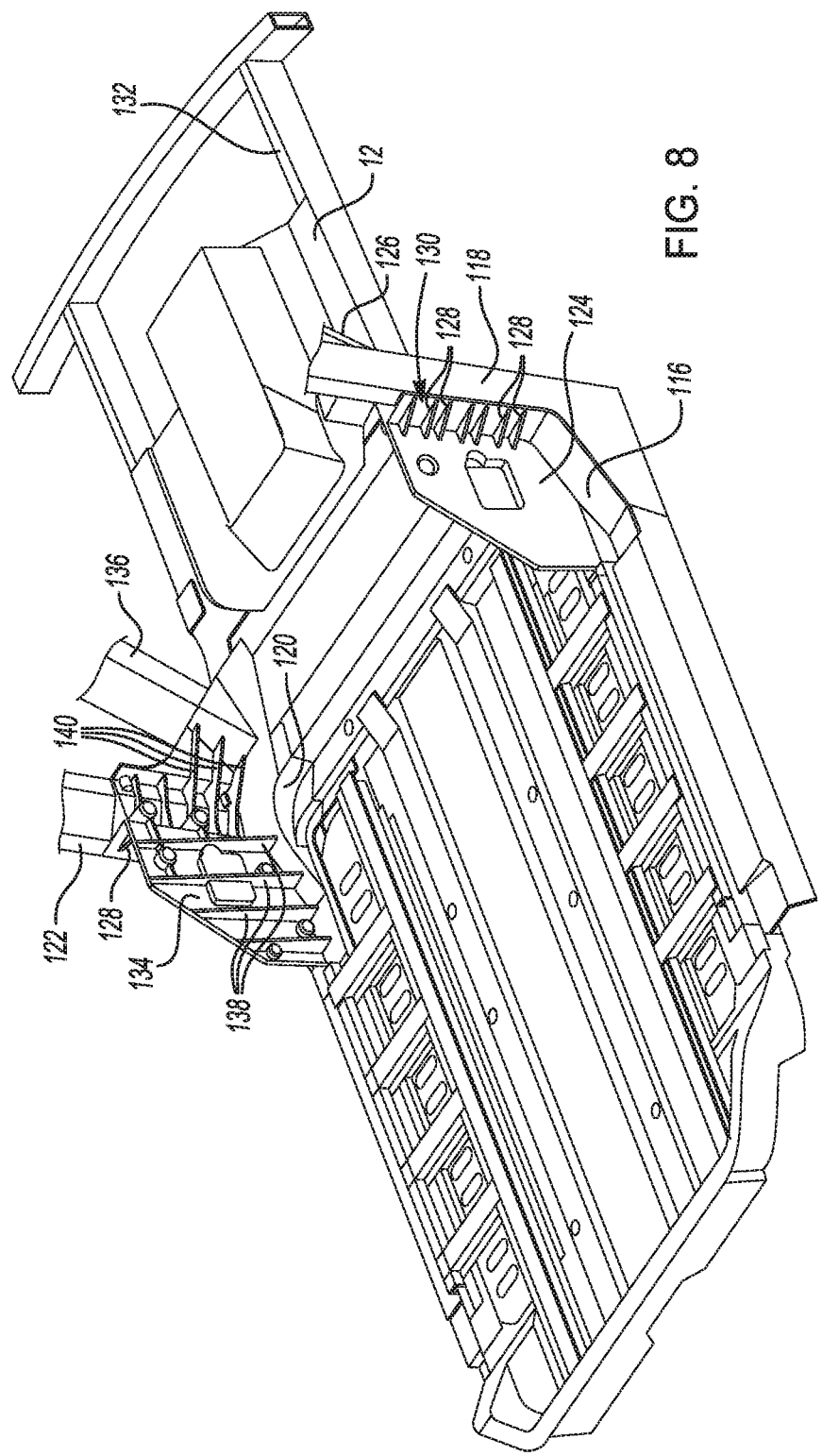
FIG. 8 is a top right perspective view of the front portion the interlocking body and floor pan assembly of FIG. 7 further showing B-pillar caps in position.

Referring to FIG. 8 and again to FIG. 7, after installation of the first floor-cap 116 and the second floor-cap 120, two B-pillar caps are added. These include a first B-pillar cap 124 which is fixed to the first floor-cap 116, the right side "B" pillar structure 118, and to a reinforcing member 126 (not fully visible in this view) joined to connecting structure 132. Multiple gusset plates 128 can also be used to reinforce the connection of the the first B-pillar cap 124 to a rear face 130 of the B-pillar structure 118. A second B-pillar cap 134 is fixed to the second floor-cap 120, the left side "B" pillar structure 122, and to a reinforcing member 136. Multiple vertical gusset plates 138 are used to reinforce an inner surface of the second B-pillar cap 134 and multiple horizontal gusset plates 140 are similarly used. Gusset plates 128 are also used on the second B-pillar cap 134. It is noted the vertical gusset plates 138 and the multiple horizontal gusset plates 140 are also used on the first B-pillar cap 124 but are not visible in this view.

Referring to FIG. 9 and again to FIG. 7, the left-handed torque box member 60 is shown prior to installation of the second floor-cap 120. The right-handed torque box member 61 (shown in FIG. 1) is similar and is therefore not discussed further herein. The left-handed torque box member 60 may be a casting or a stamped or formed construction and includes a pocket 142 which receives a first or left end of the compartment front cross-beam 26. The left-handed torque box member 60 is also connected to each of the left side "B" pillar structure 122 and the reinforcing member 136. The left-handed torque box member 60 further includes a substantially horizontally oriented mounting flange 144 onto which the sub-floor front cross-beam 32 of the sub-floor assembly 14 is mounted. The beam wall 66 of the compartment front cross-beam 26 is shown prior to installation of the shear plate 62 shown and described in reference to FIGS. 3, 5 and 8. The beam wall 66 may be recessed into front cross-beam 26. The left-handed torque box member 60 provides a further connection point for a front left compartment beam 148.

Figure 9:
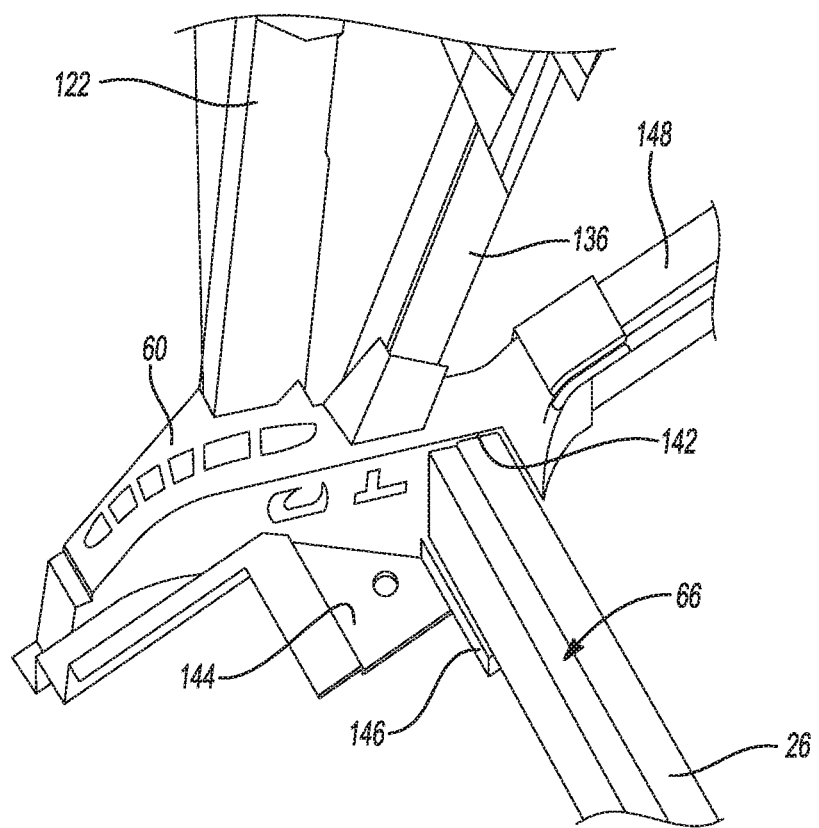
FIG. 9 is a top right perspective view of area 9 of FIG. 1.

With continuing reference to FIGS. 1 and 9, in addition to the left-handed torque box member 60 and the right-handed torque box member 61, a first rear torque box member 150 is used to join the first rocker member 22 to the compartment rear cross-beam 28, and a second rear torque box member 152 is used to join the second rocker member 24 to the compartment rear cross-beam 28. The first rear torque box member 150 and the second rear torque box member 152 each include a flange similar to the flange 144 onto which the sub-floor front cross-beam 32 of the sub-floor assembly 14 is mounted.

An interlocking body and floor pan assembly 10 of the present disclosure offers several advantages. These include interlocking or capping effects provided by loading a floor sub on top of a compartment subassembly with a pillar member on top of a floor torque box member and on top of a compartment torque box member. A body floor includes a structural perimeter sized to top load past front and rear rail structural sections. Perimeter outer surfaces are canted wider than a section bottom to provide an interlocking relationship to body structure and to minimize wipe off of structural adhesive used to join structural members.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An interlocking body and floor pan assembly for a below-floor energy stored vehicle, comprising:
   a vehicle structural assembly including a front compartment section connected to a rear compartment section using a first rocker member and an opposed second rocker member oriented parallel to the first rocker member;
   the vehicle structural assembly is configured to define a bucket configuration having faces of each of the front compartment section and the rear compartment having oppositely facing structural faces with the front compartment section angularly oriented forward at a top and rearward at a bottom, and the rear compartment section angularly oriented rearward at a top and forward at a bottom; and
   a prefabricated sub-floor assembly angularly configured such
   that the sub-floor assembly seats on a flange structure extending from each of the front compartment section and the rear compartment section,
   wherein the front compartment section includes a compartment front cross-beam and the rear compartment section includes a compartment rear cross-beam which is oriented substantially parallel to the compartment front cross-beam.

2. The interlocking body and floor pan assembly for a below-floor energy stored vehicle of claim 1, wherein:
   the structural faces of the compartment front cross-beam include:
      an upper forward-facing angular surface; and
      a lower rear-facing angular surface, which face a sub-floor front cross-beam of the sub-floor assembly; and
   the structural faces of the compartment rear cross-beam include:
      an upper rearward facing angular surface; and
      a lower forward-facing angular surface which face a sub-floor rear cross-beam of the sub-floor assembly.

3. The interlocking body and floor pan assembly for a below-floor energy stored vehicle of claim 2, wherein a gap is provided between the rear-facing angular surface of a rear-facing beam wall of the compartment front cross-beam and a front-facing angular surface of an outer wall of the sub-floor front cross-beam of the sub-floor assembly, the gap maintained by orienting the rear-facing angular surface substantially parallel with the front-facing angular surface.

4. The interlocking body and floor pan assembly for a below-floor energy stored vehicle of claim 1, wherein the first rocker member and the second rocker member are angularly oriented from an upper outboard edge downwardly pitching to a lower inboard edge of each of the first rocker member and the second rocker member providing the bucket configuration for the first rocker member and the second rocker member.

5. The interlocking body and floor pan assembly for a below-floor energy stored vehicle of claim 1, wherein:

the first rocker member includes a right-facing angular surface facing from a driver side toward a passenger side of the vehicle, which faces a left support-beam of the sub-floor assembly; and the second rocker member includes a left-facing angular surface facing from the passenger side toward the driver side of the vehicle, which faces a right support-beam of the sub-floor assembly.

6. The interlocking body and floor pan assembly for a below-floor energy stored vehicle of claim 1, wherein an outer perimeter of the sub-floor assembly is larger than an inner perimeter of the vehicle structural assembly.

7. The interlocking body and floor pan assembly for a below-floor energy stored vehicle of claim 6, further including a design clearance provided between the outer perimeter of the sub-floor assembly and the inner perimeter of the vehicle structural assembly, wherein the design clearance is approximately 10 mm.

8. The interlocking body and floor pan assembly for a below-floor energy stored vehicle of claim 1, further including:
- a front torque box member provided at each of opposed ends of the compartment front cross-beam creating a connection of the compartment front cross-beam with each of the first rocker member and the second rocker member; and
- a rear torque box member provided at opposed ends of the compartment rear cross-beam creating a connection of the compartment rear cross-beam with each of the first rocker member and the second rocker member.

9. The interlocking body and floor pan assembly for a below-floor energy stored vehicle of claim 8, further including first and second floor-caps located at front corners of the sub-floor assembly and positioned on top of the compartment front cross-beam and covering the front torque box member.

10. The interlocking body and floor pan assembly for a below-floor energy stored vehicle of claim 9, further including:
- a first B-pillar cap fixed to the first floor-cap and a right side "B" pillar structure; and
- a second B-pillar cap fixed to the second floor-cap and a left side "B" pillar structure.

11. An interlocking body and floor pan assembly for a below-floor energy stored vehicle, comprising:
- a vehicle structural assembly including a front compartment section connected to a rear compartment section using a first rocker member and an opposed, parallel oriented second rocker member;
- the front compartment section includes a compartment front cross-beam and the rear compartment section includes a compartment rear cross-beam oriented substantially parallel to the compartment front cross-beam;
- the vehicle structural assembly defining a bucket configuration having faces of each of the compartment front cross-beam and the compartment rear cross-beam angularly oriented from an upper outboard edge downwardly pitching to a lower inboard edge; and
- a prefabricated sub-floor assembly seated on a flange structure extending from the front compartment section and the rear compartment section and positioned with a clearance to the bucket configuration of the vehicle structural assembly;
- wherein an outer perimeter of the sub-floor assembly is larger than an inner perimeter of the vehicle structural assembly.

12. The interlocking body and floor pan assembly for a below-floor energy stored vehicle of claim 11, further including first and second torque box members individually provided at each of opposed ends of the compartment front cross-beam creating a connection of the compartment front cross-beam with each of the first rocker member and the second rocker member, each of the first and second torque box members having a flange supporting a sub-floor front cross-beam of the sub-floor assembly.

13. The interlocking body and floor pan assembly for a below-floor energy stored vehicle of claim 12, further including third and fourth torque box members individually provided at each of opposed ends of the compartment rear cross-beam creating a connection of the compartment rear cross-beam with each of the first rocker member and the second rocker member, each of the third and fourth torque box members having a flange supporting a sub-floor rear cross-beam of the sub-floor assembly.

14. The interlocking body and floor pan assembly for a below-floor energy stored vehicle of claim 13, further including first and second floor-caps located at front corners of the sub-floor assembly and positioned on top of the compartment front cross-beam and covering the first and second torque box members.

15. The interlocking body and floor pan assembly for a below-floor energy stored vehicle of claim 14, further including third and fourth floor-caps located at opposed rear corners of the sub-floor assembly and positioned on top of the compartment rear cross-beam and covering the third and fourth torque box members.

16. The interlocking body and floor pan assembly for a below-floor energy stored vehicle of claim 11, further including:
- a rear-facing angular surface of the compartment front cross-beam facing a sub-floor front cross-beam of the sub-floor assembly; and
- a shear plate connected to each of the compartment front cross-beam and the sub-floor front cross-beam of the sub-floor assembly.

17. An interlocking body and floor pan assembly for a below-floor energy stored vehicle, comprising:
- a vehicle structural assembly including a front compartment section connected to a rear compartment section using a first rocker member and an opposed, parallel oriented second rocker member;
- the front compartment section including a compartment front cross-beam and the rear compartment section including a compartment rear cross-beam oriented substantially parallel to the compartment front cross-beam;
- a prefabricated sub-floor assembly seated on a flange structure extending from each of the front compartment section and the rear compartment section and positioned with a clearance to the bucket configuration of the vehicle structural assembly, the sub-floor assembly having a sub-floor front cross-beam;
- a rear-facing angular surface of the compartment front cross-beam facing the sub-floor front cross-beam of the sub-floor assembly; and
- a shear plate connected to each of the compartment front cross-beam and the sub-floor front cross-beam of the sub-floor assembly.

18. The interlocking body and floor pan assembly for a below-floor energy stored vehicle of claim 17, wherein the vehicle structural assembly defines a bucket configuration having faces of each of the compartment front cross-beam and the compartment rear cross-beam having oppositely facing structural faces with the front cross beam angularly oriented forward at a top and rearward at a bottom, and the rear cross beam angularly oriented rearward at a top and forward at a bottom.

19. The interlocking body and floor pan assembly for a below-floor energy stored vehicle of claim 17, wherein an outer perimeter of the sub-floor assembly is larger than an inner perimeter of the vehicle structural assembly where the sub-floor assembly contacts the vehicle structural assembly.

* * * * *